Jan. 15, 1952     A. L. ALAJ     2,582,735
HOT PLATE
Filed March 28, 1949
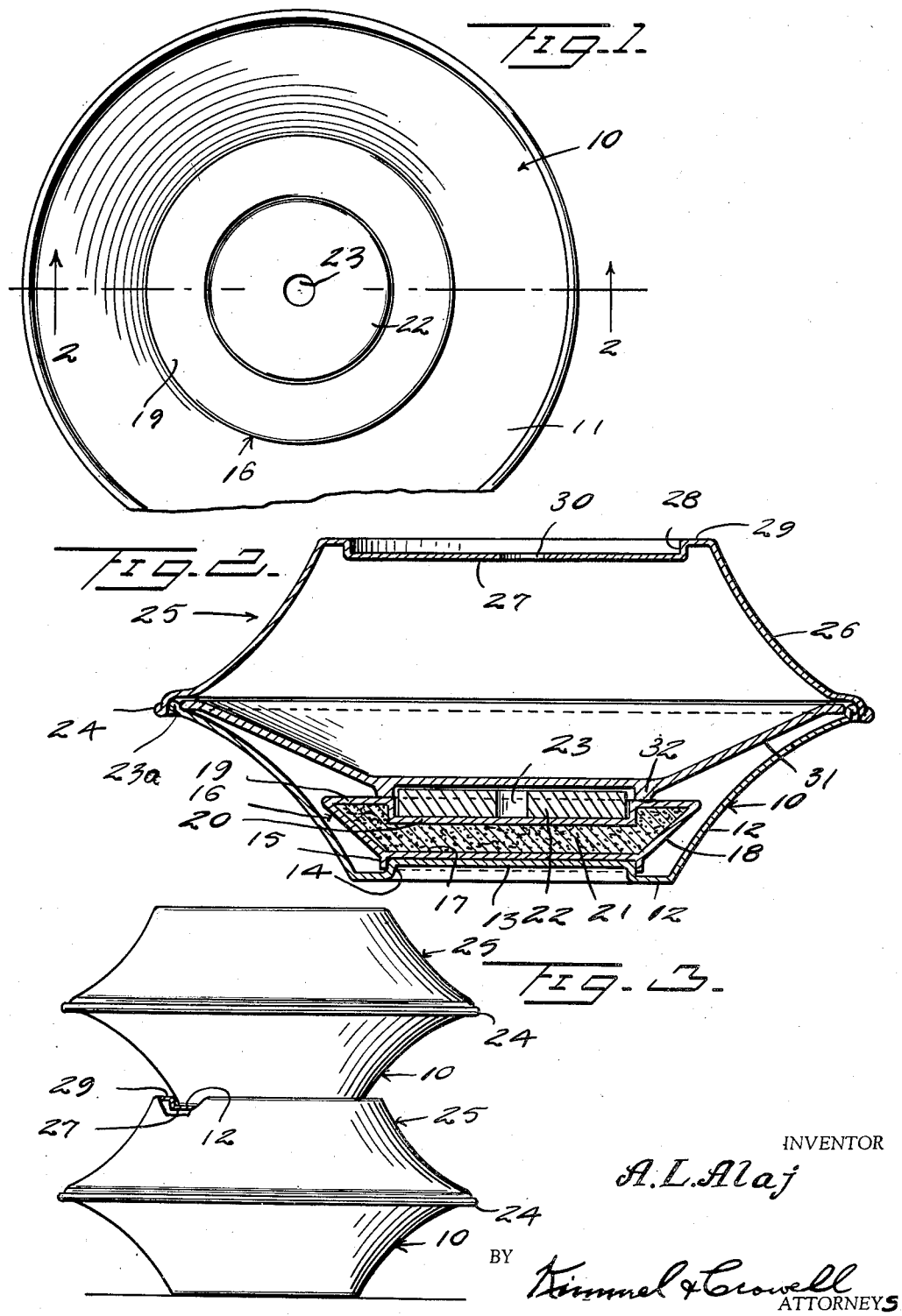
INVENTOR
A. L. Alaj
BY
Kimmel & Crowell
ATTORNEYS Patented Jan. 15, 1952

2,582,735

UNITED STATES PATENT OFFICE 2,582,735

HOT PLATE

Antoine L. Alaj, Arlington, Va.

Application March 28, 1949, Serial No. 83,917

1 Claim. (Cl. 126—246)

This invention relates to a hot plate, and, more particularly, to a device for maintaining several plates or the like, and the contents thereof, in heated condition during service, as while en route from the kitchen to the table or while standing either in the kitchen or on the table.

A primary object of the invention is to provide an improved hot plate characterized by means whereby a serving plate or the like may be maintained in heated condition for a relatively long period of time, to insure the serving of the food on the plate in hot condition.

Still another object of the invention is to provide a device of this character provided with a cover plate of novel configuration whereby to retain the heat imparted to the plate in relatively close proximity thereto.

An additional object of the invention is to provide such a device so arranged and constructed that a plurality of the devices may be stacked or nested in such manner that a relatively large number of heated plates may be simultaneously conveyed from the kitchen to the table.

Still another object of the invention is to provide such a hot plate of the character disclosed in my Patent No. 1,793,298, dated February 17, 1931, and embodying certain improvements thereover.

In the drawing:

Figure 1 is a top plan view, partially broken away, of one form of device embodying the instant inventive concept, the cover or lid thereof being removed.

Figure 2 is an enlarged sectional view taken substantially along the line 2—2 of Figure 1 as viewed in the direction indicated by the arrows, the cover being shown in position.

Figure 3 is a reduced side elevational view, partially in section, showing a plurality of the devices in nested or stacked relation.

Similar reference characters refer to similar parts throughout the several views of the drawings.

Referring now to the drawings in detail, there is generally indicated at 10 a dish or container, preferably round in plan, the side walls 11 of which are concavely arcuate in cross sectional configuration, and the bottom of which is provided with a circular peripheral flange 12, having an upwardly offset bottom 13, the rim 14 of which interiorly of the dish 10 forms a seat for a flange 15 depending from the bottom of a housing generally indicated at 16, the latter including a bottom plate 17 adapted to rest upon the top of offset bottom 13, an angularly inclined side wall 18, and a top including an annular peripheral rim 19, and a central circular depressed portion 20. The member 16 is preferably hollow and filled with a suitable insulating material 21 such as asbestos, or the like.

Adapted to be seated within recess 20 is a circular heat retaining element or disc 22, comprised of a suitable metal which may be aluminum or the like, adapted to be heated to a relatively high degree and retain its heat for a substantial period of time. Disc 22 may, if desired, be provided with a central bore or aperture 23 to facilitate positioning and removal thereof. The upper portion of the side walls 11 of dish 10 are provided with a peripheral flange 23a, extending vertically, adapted to be encircled by a depending corresponding flange 24 of a lid or cover member generally indicated at 25 which includes arcuate exteriorly concaved side walls 26 and a downwardly offset top wall 27 provided peripherally with upwardly extending side walls 28 terminating in a horizontal flange 29, thus forming a depression of an internal diameter slightly in excess of the external diameter of flange 12, whereby the lower portion of dish 10 may be seated or nested in the recess in the top of cover 25, as best shown in Figure 3.

If desired the recess in cover 25 may be provided with a centrally positioned finger engaging aperture 30 to facilitate removal and positioning thereof.

In the use and operation of the device the disc 22 is adapted to be first preheated, as in an oven or the like, to a desired temperature, and then placed in the recess formed in the top of member 16 which has been previously positioned within dish 10. A serving plate 31, provided with the conventional depending flange 32, is then adapted to be positioned over the heated member 22, food to be served hot placed on the plate, and the cover or lid 25 placed thereover. A plurality of the devices may then be stacked or nested for transportation to the table, and the arrangement is such that the food on the plate 31 is retained in a heated or hot condition for a relatively long period of time.

The dish 10 and its lid 25 may be constructed of any desired material, although a material such as aluminum has been found preferable due to its high heat retentive qualities, and, correspondingly, both disc 22 and member 16 may also be of any desired heat retentive material. Correspondingly, the size of the device may also be varied to accommodate a variety of sizes of plates, and the shape may also be other than circular, as for example, oval, rectangular, or polygonal.

From the foregoing, it will now be seen that there is herein provided an improved hot plate which accomplishes all the objects of this invention and others, including many advantages of great practical utility and commercial importance.

As many embodiments may be made of this inventive concept and as various modifications may be made in the embodiment herein shown and described, it is to be understood that all matter herein is to be interpreted merely as illustrative, and not in a limiting sense.

What I claim:

A hot dish container comprising a member formed with a flared side wall upon the upper edge of which the rim of a dish is adapted to seat, an upwardly extending flange carried by said side wall within which the dish loosely engages, said member having a bottom wall, said bottom wall having an upwardly offset central wall portion, a relatively thin closed housing within said member spaced from the flared side walls and seated on said central wall portion, heat insulating means in said housing, said housing and insulation being removable as a unit, a depending annular flange carried by said housing engaging about said offset central portion to thereby hold said housing concentric to said member and spaced from the flared side wall, a downwardly offset recess formed in the top wall of said housing, and a disc-shaped heat retaining element in said recess and projecting above the top wall of said housing for close heat exchange relation with the bottom of a dish seated on said side wall, the combined closed housing and heat retaining element being of a height no greater than substantially half that of the flared side wall.

ANTOINE L. ALAJ.

REFERENCES CITED

The following references are of record in the file of this patent:

UNITED STATES PATENTS

| Number | Name | Date |
| --- | --- | --- |
| 150,769 | Fitch | July 15, 1873 |
| 189,412 | Wright | Apr. 10, 1877 |
| 547,759 | Baraban | Oct. 15, 1895 |
| 1,045,101 | Wojidkow | Nov. 19, 1912 |
| 1,049,385 | Mohrenwitz | Jan. 7, 1913 |
| 1,370,722 | Adam | Mar. 18, 1921 |
| 1,429,783 | Scott | Sept. 19, 1922 |
| 1,635,918 | Alaj | July 12, 1927 |
| 1,793,298 | Alaj | Feb. 17, 1931 |
| 1,940,172 | Hybinette | Dec. 19, 1933 |
| 1,948,778 | Zoia | Feb. 27, 1934 |

FOREIGN PATENTS

| Number | Country | Date |
| --- | --- | --- |
| 85,702 | Switzerland | Sept. 1, 1920 |